United States Patent [19]

MacKinnon

[11] 4,107,962
[45] Aug. 22, 1978

[54] AUTO ANTI-THEFT DEVICE

[76] Inventor: Richard B. MacKinnon, 4613 Stearns Hill Rd., Waltham, Mass. 02154

[21] Appl. No.: 791,856

[22] Filed: Apr. 28, 1977

[51] Int. Cl.$^2$ .............................................. B60R 25/04
[52] U.S. Cl. ..................................... 70/243; 180/114; 307/10 AT
[58] Field of Search ...................... 70/243, 242, 255; 123/198 B; 180/114; 307/10 AT; 340/63, 64; 361/196

[56] References Cited

U.S. PATENT DOCUMENTS

| | | | |
|---|---|---|---|
| 2,980,826 | 4/1961 | Horton | 361/196 |
| 3,614,458 | 10/1971 | Stein | 180/114 X |
| 3,657,697 | 4/1972 | Schultz | 307/10 AT X |
| 3,707,702 | 12/1972 | Plattner | 340/64 |
| 3,910,372 | 10/1975 | Mozzar | 70/255 X |
| 3,930,226 | 12/1975 | Plumberg | 340/64 |
| 3,968,666 | 7/1976 | Mackinnon | 70/243 |

Primary Examiner—Rodney H. Bonck
Attorney, Agent, or Firm—Wolf, Greenfield & Sacks

[57] ABSTRACT

A circuit for controlling the operability of an electrically-operated fuel system, for a vehicle, and particularly for controlling a fuel injection system. The circuitry includes a timing network and a concealed switch the position of which is only known to an authorized operator of the vehicle. When the concealed switch is closed by an authorized person an associated relay is energized and the timing network is inhibited which in turn maintains a main control relay in its enabling position permitting normal operation of the fuel system. In this authorized mode of operation the timing network is essentially maintained in a state where it is not permitted to time-out. When an unauthorized person gains entry to the vehicle, by-passing the ignition switch, the concealed switch is not closed, nor is the associated relay energized. The timing network is thus permitted to time-out and after a presettable period the main control relay is switched to its disabling position interrupting operation of the fuel system and, of course, the vehicle after the unauthorized person has traveled only a relatively short distance thinking he has safely taken the vehicle.

8 Claims, 2 Drawing Figures

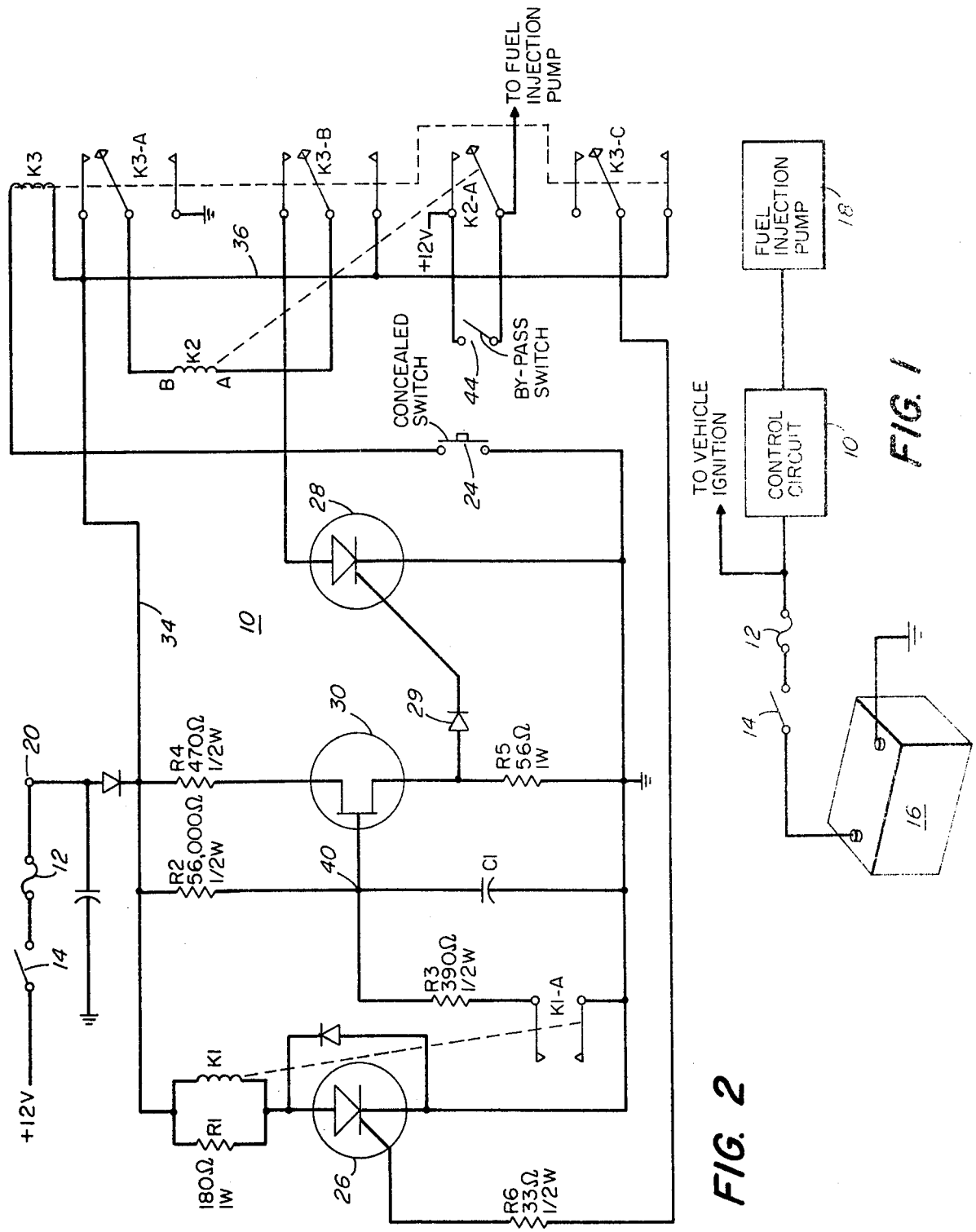

AUTO ANTI-THEFT DEVICE

BACKGROUND OF THE INVENTION

The present invention relates in general to an anti-theft apparatus or circuit for an automobile. More particularly, this invention is concerned with an anti-theft circuit for use in a vehicle having an electrically operated fuel system such as a vehicle operated by a fuel injection system.

My U.S. Pat. No. 3,968,666 shows a circuit for controlling the operation of the vehicle by interrupting the fuel flow to the carburetor by operation of a solenoid or relay. This prior art circuit includes a concealed switch only known to an authorized operator and which, when closed, permits normal operation of the vehicle. This circuit is adapted for use primarily with a fuel system employing the conventional mechanically operated fuel pump and carburetor. One of the advantages to this known circuit is that once the unauthorized person has by-passed the ignition switch, the vehicle will actually start because there is some fuel in the fuel pump, carburetor and interconnecting lines. However, the unauthorized operator will be able to travel only a relatively short distance and usually the vehicle ceases operation in a location where the unauthorized operator has no other alternative other than to abandon the vehicle as quickly as possible. However, with a fuel injection system a circuit of the type shown in U.S. Pat. No. 3,968,666 will not permit even a slight operation and motion of the vehicle because the electrically operated fuel system requires immediate electrical control for operation thereof. Because the vehicle will not start at all the thief is immediately alerted to the apparent presence of an anti-theft circuit, and may then be able to trace the location of this circuit to by-pass the circuit. On the other hand, if the vehicle had started and moved a relatively short distance then the thief would most likely be in a disadvantageous position to continue any further investigation as to the inoperability of the vehicle.

Accordingly, an object of the present invention is to provide an anti-theft apparatus or circuit for controlling the operability of an electrically-operated fuel system for a vehicle.

Another object of the present invention is to provide a control circuit in accordance with the preceding object that operates to permit temporary operation of the vehicle when entered by an unauthorized operator. In accordance with the present invention the timing network comprises a part of the anti-theft circuit and when an unauthorized person enters the vehicle not being aware of the presence of a concealed enabling switch, the timing network times-out and the operation of the fuel-system then is interrupted.

Another object of the present invention is to provide a bypass switch associated with the anti-theft circuit essentially by-passing the timing network and concealed switch. This arrangement is used, for example, when the authorized operator leaves the vehicle with an attendant at a parking lot.

SUMMARY OF THE INVENTION

To accomplish the foregoing and other objects of this invention there is provided an anti-theft circuit for a motor vehicle of the type having an electrically operated fuel system, and an ignition switch receiving energy from a battery in the vehicle. The invention is particularly adapted for use with a vehicle having a fuel injection system. The circuit of this invention comprises an electrical bistable means preferably in the form of an electrically resettable latching relay having a set of contacts associated therewith for controlling the operation of the fuel system. These contacts may simply make and break the electrical voltage connection from the power source such as the vehicle battery to the fuel injection system. A concealed switch means is provided preferably disposed in the driving compartment of the vehicle and in a position known only by an authorized operator but not known by an unauthorized operator. The circuit means intercouples between the main relay and the concealed switch, and this means preferably comprise a second relay preferably directly connected with the concealed switch for maintaining the electrical bistable means in an enabling position upon operation of the concealed switch by the authorized operator. The circuit includes also a timing network and circuit path means intercoupling the switch means and an input to the timing network for operating the timing network when the switch means is unoperated as occurs when an unauthorized person enters the vehicle. The timing network provides a signal at the end of the timing period to change the state of the electrical bistable means to its disabling position interrupting further operation of the fuel system. The timing network may comprise a uni-junction transistor and associated RC timing network coupled to the control electrode of the uni-junction transistor. An SCR device couples to the input of the uni-junction network and has a third relay associated therewith having an operating contact associated with the RC timing network. When an authorized operator enters the vehicle and closes the concealed switch the SCR conducts, the third relay latches, its associated contacts close, and the timing network is essentially inhibited from further operation. However, when an unauthorized operator enters the vehicle the third relay is not energized, its associated contacts remain open and the timing network is permitted to timeout. It is the timing out of this network that causes a change in state of the main control relay causing it to change to its disabling position interrupting further operation of the system.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a general block diagram of a system in accordance with the present invention; and FIG. 2 is a detailed circuit embodiment for the control circuit of FIG. 1.

DETAILED DESCRIPTION

The device of the present invention is for use in a motor vehicle that typically contains an ignition switch receiving energy from a battery in the vehicle. This circuit is adapted primarily for use in a vehicle having an electrically operated fuel system such as a fuel injection system now used on many vehicles. FIG. 1 is a very general block diagram showing the control circuit 10 of the present invention connecting by way of a fuse 12 and the ignition switch 14 to the conventional storage battery 16 which is typically a 12v battery used in present day automobiles. The battery 16 typically has opposite polarity posts, one of which is grounded and the other of which is a power lead for coupling directly or indirectly to the ignition switch 14. The output from the control circuit 10 couples to a fuel injection pump 18 which is a conventional fuel injection device now used in automobiles. The control circuit 10 is discussed in more detail hereinafter and controls the coupling of electrical power to the fuel injection pump 18. For an authorized operator the control circuit 10 permits the coupling of power to the fuel injection pump for operation thereof. Upon entry of an unauthorized operator to the vehicle the control circuit 10 is adapted to operate for a relatively short period of time to enable operation of the fuel injection pump for a relatively short period of time after which the control circuit 10 interrupts further operation of the fuel system.

The ignition switch 14 may be a conventional ignition switch presently available in the motor vehicle and when it is closed the energy from the battery is coupled in a conventional manner to the vehicle ignition circuitry which conventionally comprises a high voltage coil not shown in the drawing.

Referring now to FIG. 2, there is shown the ignition switch 14 coupling by way of fuse 12 to the input terminal 20 of the control circuit 10. When the switch 14 is closed by an authorized operator or by-passed by an unauthorized operator the +12 volt level is coupled to input terminal 20. The output from the control circuit is taken at the contact K2-A. One terminal of the contact K2-A couples directly to the +12 volt line while the other terminal of the contact couples to the fuel injection pump 18. When the contact is opened power is interrupted to the fuel system whereas when the contact is closed power couples from the control circuit to the fuel injection system.

The control circuit 10 comprises a concealed switch 24, SCR's 26 and 28, uni-junction transistor 30, and relays K1, K2, and K3. The timing network of the present invention comprises, in addition to the uni-junction transistor 30, capacitor C1, and resistors R2, R3, R4 and R5. The relay K1 controls the operation of the timing network. The relay K2 is the main control relay having contacts for controlling the fuel system. The relay K3 is a relay that is operated from the concealed switch 24. The relay K2 is essentially a bi-polar relay or an electrically resettable latching relay requiring opposite polarities impressed thereacross for changing the state thereof. The relay K2 may be of the type sold by Potter & Brumfield having a 12 volt coil and identified by their part No. KUL11D15S/12.

The relay K1 has its coil coupled in parallel with resistor R1 and in series with SCR26. When SCR26 is conductive relay K1 is energized and its associated contact K1-A closes. This action inhibits the operation of the timing network preventing any firing of the uni-junction transistor 30 and in turn preventing conduction of the SCR28. The concealed switch 24 connects to ground and to the coil of relay K3. Switch 24 is a normally open momentary switch and when this switch is closed the coil K3 is energized. Coil K3 has three sets of single pole-double throw contacts K3-A, K3-B, and K3-C. The function of these contacts will be discussed in more detail hereinafter with regard to the total operation of the circuit. The contact K3-C is the contact that controls the operation of the timing network. Also, the main control relay K2 is controlled from the contacts K3-A and K3-B of relay K3.

When an unauthorized operator enters the vehicle and turns on the ignition key, or when an unauthorized operator closes the ignition circuit a +12 volt level is provided on conductor lines 34 and 36 providing power for the timing network and the relays K1, K2 and K3. An authorized person knowing the position of switch 24 then closes switch 24 to energize relay K3. In FIG. 2 the relay K3 is shown in its de-energized position. Thus, when relay K3 is energized a normally open side of each of its contacts closes and the normally closed side opens. This action causes the relay coil K2 to have its terminal A at the positive voltage level through contact K3-B and terminal B at ground through contact K3-A. The third contact K3-C of relay K3 closes so that the positive voltage level is coupled by way of resistor R6 to the gate electrode of SCR26 causing the SCR to fire into conduction which in turn energizes the coil of relay K1. This action causes the associated contact K1-A to close thereby clamping the node 40 near ground potential preventing any conduction of the uni-junction transistor 30. It is noted that the value of resistor R2 is much greater than the value of resistor R3 and thus with contact K1-A closed the input to the uni-junction transistor is held at a relatively low voltage level near ground. The output from the timing network taken at one side of resistor R5 is thus at ground potential thereby holding the SCR 28 in its non-conducting state.

When the switch 24 is closed, the relay K3 may be only temporarily energized. However, the SCR 26 is maintained conductive as long as the biasing voltages are provided for the circuit. When the contacts K3-A and K3-B revert to their de-energized position this has no effect on the coil of relay K2 as the circuit path is opened by virtue of the non-conducting SCR28.

The relay K2 is maintained in this authorized position with its associated contacts K2-A closed as long as each time that the authorized operator enters the vehicle, the concealed switch 24 is operated. However, if an unauthorized operator enters the vehicle and the switch 24 is not closed then the associated relay K3 is maintained in its de-energized position as shown in FIG. 2. Under this condition the contacts K3-A and K3-B are in the position shown in FIG. 2 with a positive voltage being applied to terminal B and terminal A being open-circuited through the SCR28 at the very commencement of power to the circuit. With the contact K3-C in the position shown in FIG. 2 the SCR26 is non-conductive and thus the relay K1 associated therewith is in its de-energized position. The associated contact K1-A of the relay is thus in the open position as shown in FIG. 2 and the timing network comprising uni-junction 30 is permitted to time-out. The voltage at node 40 charges exponentially at a rate dependent upon the value of capacitor C1 and resistor R2. Resistor R2 may be a potentiometer for varying the charging time of the circuit. The voltage at node 40 charges any positive sense forward +12 volts. At a particular voltage which is a function of the values of resistors R4 and R5 the uni-junction transistor 30 fires and a positive-going pulse is transmitted by way of diode 29 to the gate electrode of SCR28 causing SCR28 to go into conduction. When this occurs a completed path to ground is provided through contact K3-B providing a ground or zero potential at terminal A of relay K2. This reverse potential now across relay K2 causes the relay to switch to its alternate position for inhibiting power to the fuel injection system. The contact K2-A associated with relay K2 opens.

If an authorized operator enters the vehicle and forgets to operate the concealed switch, he will drive a short distance, the relay K2 will operate after the termination of the timing period of the timing network and operation will cease. The authorized operator can then easily close the switch 24 to operate the relay K3 causing the SCR28 to cease conduction and latching the timing network to its inhibited state. This operation automatically reverts the relay K2 to its alternate enabling state permitting power to couple to the fuel injection pump 18.

FIG. 2 also shows a by-pass switch 44 which is coupled directly across the terminals of contact K2-A. Swtich 44 is shown in its open position where it has no control over the operation of the circuit. However, when switch 44 is closed, power is continuously available to the fuel injection pump independent of the operation of the concealed switch 24. The by-pass switch 44 is used primarily when an authorized operator leaves his vehicle with an attendant at a parking garage.

The concealed switch 24 may be disposed in any portion of the driving compartment of the vehicle. This switch is disposed in a place that would be difficult to locate for a thief and the switch is preferably relatively small in construction. The remainder of the circuitry shown in FIG. 2 is preferably located in a hidden place in the vehicle such as in the trunk. The switch 44 is accessible by the authorized operator opening the trunk to operate the switch. Electrical wiring leads, of course, from the location of the circuitry such as in the trunk to the fuel system and the electrical system of the vehicle.

Having described one preferred implementation for the device of this invention, it should now become obvious that other embodiments and modifications thereof are contemplated as falling within the scope of the invention. It is also understood that although the preferred use is with a fuel injection system the circuit of the invention is also to be used with a normal fuel pump system where the contacts of relay K2 may energize solenoid valve.

What is claimed is:

1. An anti-theft circuit for a vehicle having an electrically-operated fuel system, and an ignition switch receiving energy from a battery in the vehicle, said circuit comprising;
    electrical bistable means having an enabling position and a disabling position for controlling the operation of the fuel system,
    a switch means disposed in the vehicle in a position known by an authorized operator but not known by an unauthorized operator,
    means intercoupling the bistable means and switch means to operate the bistable means to an enabling position upon operation of the switch means by the authorized operator,
    a timing network,
    circuit path means intercoupling the switch means and an input to the timing network for operating said timing network when the switch means is unoperated,
    said timing network providing a signal at the end of its timing period to change the state of the electrical bistable means to its disabling position interrupting further operation of the fuel system,
    said switch means comprising a momentary switch,
    said circuit path means including a semi-conductor latch means for storing an indication of closure of said switch means.

2. An anti-theft circuit as set forth in claim 1 wherein said electrical bistable means includes a main control relay having a set of responsive contacts for making and breaking the power connection to the fuel system.

3. An anti-theft circuit as set forth in claim 2 wherein said means to operate the bistable means includes a second relay having a plurality of responsive sets of contacts one of which comprises the circuit path means and at least another one of which couples to the main control relay.

4. An anti-theft circuit as set forth in claim 1 including a by-pass switch means coupled to the electrical bistable means.

5. An anti-theft circuit for a vehicle having an electrically-operated fuel system, and an ignition switch receiving energy from a battery in the vehicle, said circuit comprising;
    electrical bistable means having an enabling position and a disabling position for controlling the operation of the fuel system,
    a switch means disposed in the vehicle in a position known by an authorized operator but not known by an unauthorized operator,
    means intercoupling the bistable means and switch means to operate the bistable means to an enabling position upon operation of the switch means by the authorized operator,
    a timing network,
    circuit path means intercoupling the switch means and an input to the timing network for operating said timing network when the switch means is unoperated,
    said timing network providing a signal at the end of its timing period to change the state of the electrical bistable means to its disabling position interrupting further operation of the fuel system,
    said electrical bistable means including a main control relay having a set of responsive contacts for making and breaking the power connection to the fuel system,
    said means to operate the bistable means including a second relay having a plurality of responsive sets of contacts, one of which comprises the circuit path means and at least another one of which couples to the main control relay,
    said circuit path means further comprising a controlled semiconductor and third relay having responsive contacts for controlling the timing network.

6. An anti-theft circuit as set forth in claim 5 wherein said timing network comprises a uni-junction transistor and a capacitor charging circuit coupled to the control electrode of the uni-junction transistor.

7. An anti-theft circuit as set forth in claim 6 including a controlled rectifier means coupled from the output of the unijunction transistor to one of the contacts of the second relay.

8. An anti-theft circuit for a vehicle having an electrically-operated fuel system, and an ignition switch receiving energy from a battery in the vehicle, said circuit comprising:
    electrical bistable means having an enabling position and a disabling position for controlling the operation of the fuel system,
    a switch means disposed in the vehicle in a position known by an authorized operator but now known by an unauthorized operator,
    means intercoupling the bistable means and switch means to operate the bistable means to an enabling position upon operation of the switch means by an authorized operator, a timing network, circuit path means intercoupling the switch means and an input to the timing network for operating said timing network when the switch means is unoperated, said timing network providing a signal at the end of its timing period to change the state of the electrical bistable means to its disabling position interrupting further operation of the fuel system, said electrical bistable means including a main control relay having a set of responsive contacts for making and breaking the power connection to the fuel system, said means to operate the bistable means including a second relay having a plurality of responsive sets of contacts, one of which comprises the circuit path means and at least another one of which couples to the main control relay, said main control relay being responsive to opposite polarity signals to change the state thereof and said second relay having two sets of contacts coupling respectively to opposite sides of the main control relay.

* * * * *